Oct. 8, 1935.  W. N. GILBERT  2,016,714
SCALE
Filed May 10, 1933   3 Sheets-Sheet 2
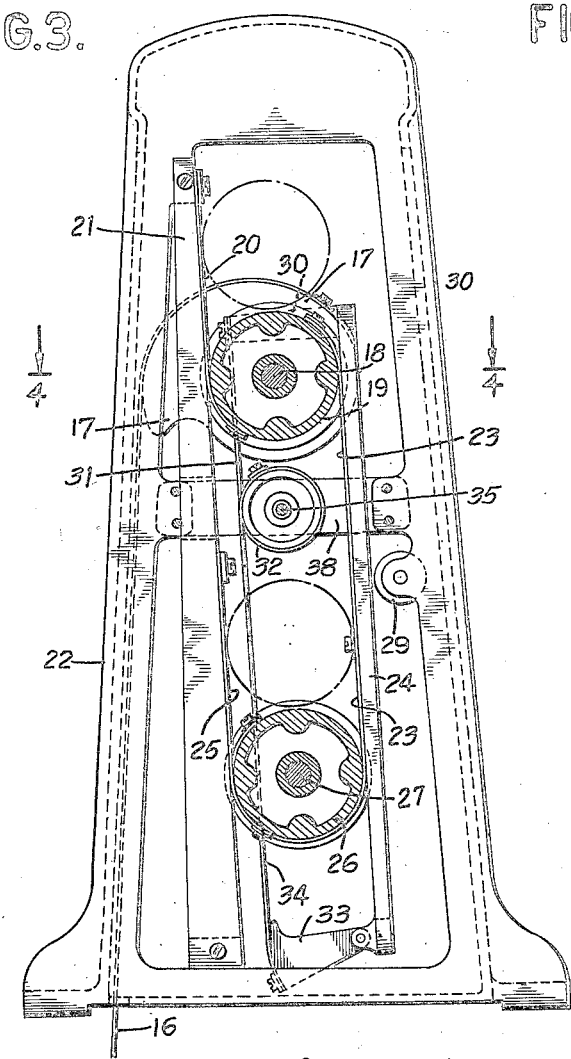
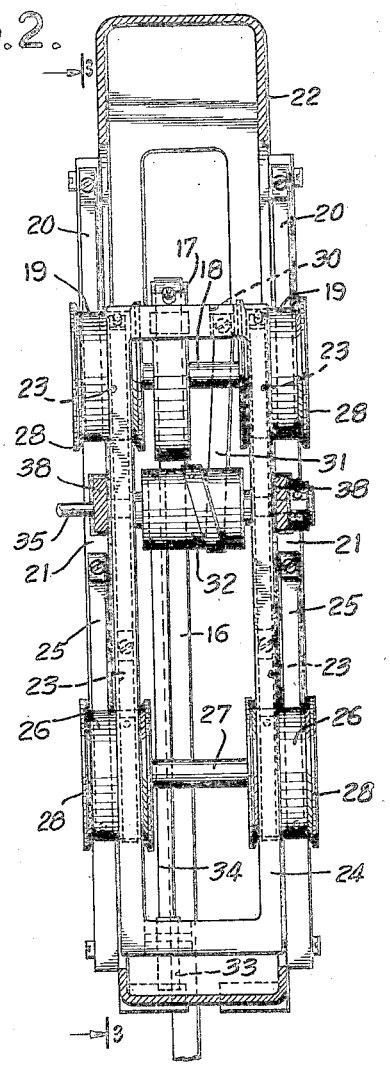
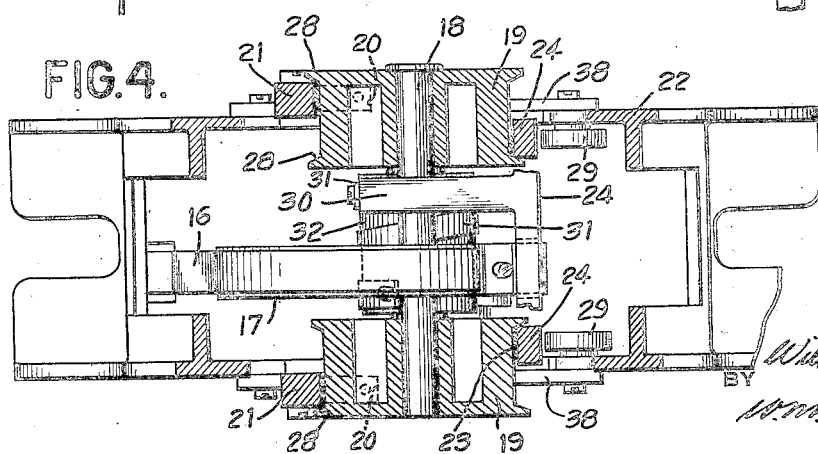

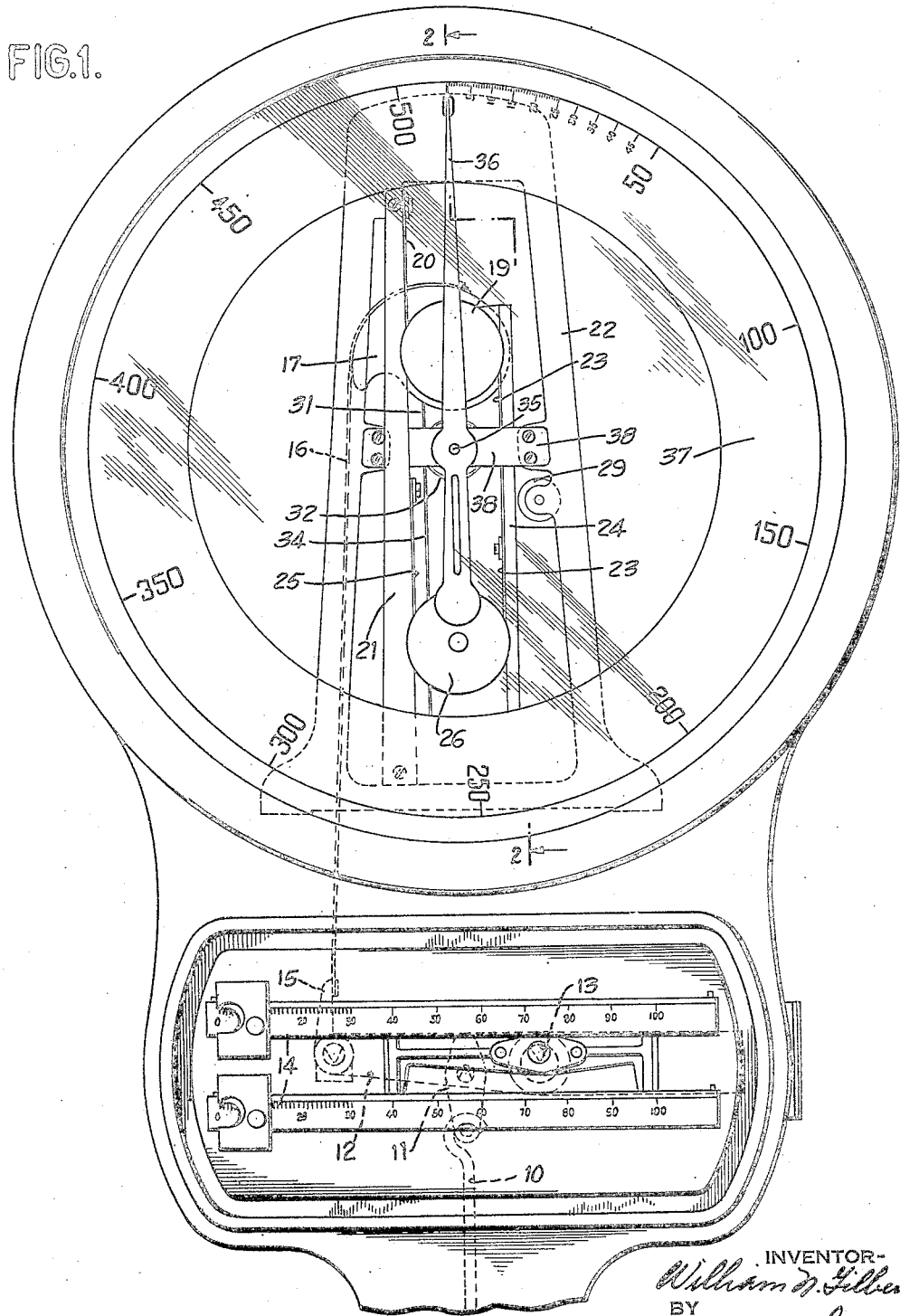

Oct. 8, 1935.  W. N. GILBERT  2,016,714
SCALE
Filed May 10, 1933  3 Sheets-Sheet 3
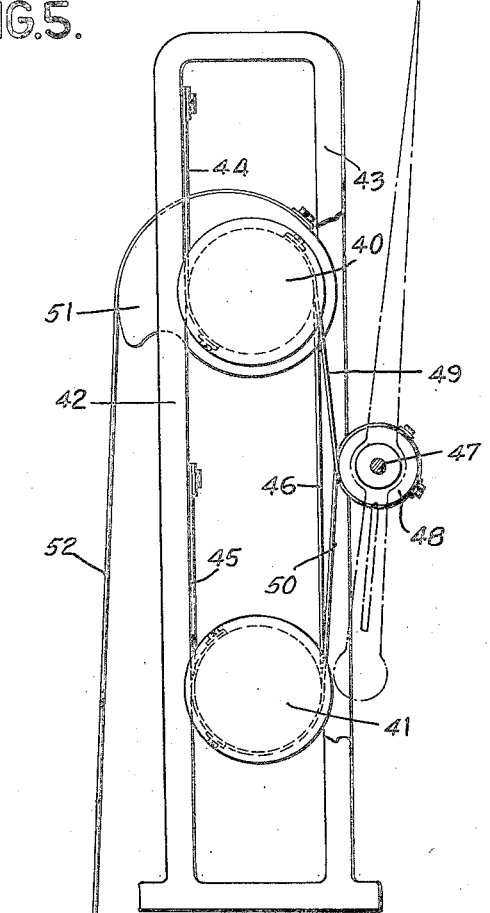
FIG.5.
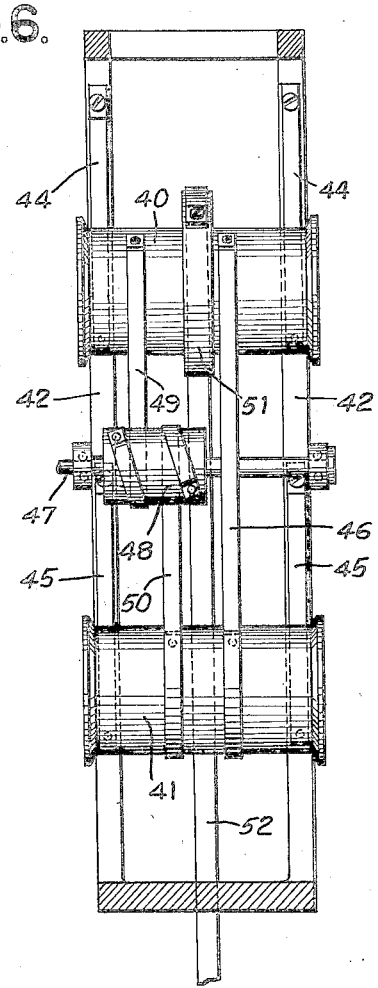
FIG.6.
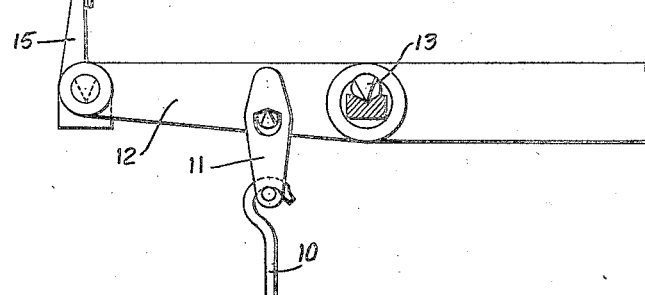
INVENTOR
William N. Gilbert
BY
ATTORNEY

Patented Oct. 8, 1935

2,016,714

UNITED STATES PATENT OFFICE 2,016,714

SCALE

William N. Gilbert, Hudson Heights, N. J., assignor, by mesne assignments, to International Business Machines Corporation, New York, N. Y., a corporation of New York Application May 10, 1933, Serial No. 670,229

17 Claims. (Cl. 265—70)

This case relates to the load counterbalancing mechanism of a scale and the object in general is to improve and simplify the device shown in applicant's Patent No. 1,862,012.

Further, the object is to provide a novel counterbalance which is not affected by out of level conditions of the scale.

Still further, the object is to provide a novel load resistant or counterbalance having a rolling engagement with its supports.

The object is also to provide a simplified combination of counterbalancing and indicating mechanism.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a front view of the upper part of the scale,

Fig. 2 is a section on line 2—2 of Fig. 1,

Fig. 3 is a section on line 3—3 of Fig. 2,

Fig. 4 is a section on line 4—4 of Fig. 3,

Fig. 5 is a view of a modified form of connection from the resistants to the indicator, and Fig. 6 is an end view of Fig. 5.

In detail, the platform and base levers (not shown) are connected to draft rod 10 to move the latter downwardly upon application of a load to the platform. Draft rod 10 is connected through a stirrup 11 to the intermediate lever 12 fulcrumed at 13 and carrying the tare bars 14. The left hand end of the lever 12 is connected by an element 15 to tape 16 which passes over and is secured to the eccentric periphery of a member 17. The latter is rigidly mounted on a shaft 18 which at opposite ends carries rollers or round spools 19. These spools are suspended at one side by tapes or ribbons 20 from guide tracks 21 rigidly secured to the frame 22 and at the other side are connected by sections of tapes or ribbons 23 to movable guide tracks 24. Also suspended from fixed guide tracks 21 by tapes 25 are round spools 26 carried by opposite ends of a shaft 27. These spools 26 are also suspended by sections of tapes 23 from the movable guide tracks 24. Thus, tapes 23 provide a tape connection independent of track 24 between the upper and lower rollers for causing them to move jointly along the tracks 21 and 24. The tracks also engage the flanges 28 of the rollers 19 and 26 to limit the axial movement of the rollers. Tracks 21 are inclined slightly to provide a slightly underlying support for the rollers thereby steadying them against lateral movement. Further, by reason of the incline of the tracks 21, the tapes 20 and 25 respectively suspending the rollers 19 and 26 from tracks 21 are also inclined. The rollers and the parts bodily movable therewith, as track 24 constitute a counterbalancing or load resistant system which by reason of the incline of the supporting tapes 20 and 25 tends to return to a vertical position which therefore constantly tends to maintain the rollers 19 and 26 firmly and effectively engaged with the track 21.

However, the counterbalancing system is not positively held to the track 21 and may, upon a violent disturbance of the scale, swing freely laterally away from this track. This lateral movement is limited by engagement of the track 24 with anti-friction rollers 29 mounted on the frame 22.

The movable tracks 24 have a horizontal extension 30 at their upper end to which is secured a tape 31 passing around and secured to a drum 32. To the lower end of track 24 is pivoted a segment 33 connected by a tape 34 to the drum 32, the weight of segment 33 holding tapes 31 and 34 taut. Drum 32 is fast to the indicator shaft 35 carrying the pointer 36 which scans the weight dial 37. The shaft 35 is journaled in the cross arms 38 secured to the frame 22.

The member 17 and rollers 19 and 26 are each statically in balance that is, the center of gravity of each is at its rotational axis. Thus, there is no pendulum counterbalancing effect produced by any one of the members 17, 19, or 26. The eccentric periphery of member 17 is designed to provide a variable moment arm between the applied load and the counterbalancing weight of members 17, 19, and 26. Since there is no pendulum action in the counterbalancing means, and rocking movement of the counterbalancing system does not cause movement of the indicator, an out of level condition of the scale will not affect the counterbalancing force or the balance between the force of the applied load and the counterbalancing force. This can be simply understood when it is considered that a tilting of the frame 22 will merely bodily prove therewith to the same extent all the parts carried by the frame without causing the rotatable parts to rotate on their pivots and roll along the tracks.

In operation, the load on the platform moves draft rod 10 downwardly rocking lever 12 counterclockwise, as viewed in Fig. 1, thereby depressing tape 16 and rocking member 17 and rollers 19 counterclockwise. Rollers 19 roll up on the tapes 20 moving upwardly along fixed guide 21 and through the upper sections of tapes 23 causing upward movement of movable tracks 24, the latter through the lower sections of tapes 23 rocking the rollers 26 counterclockwise. Rollers 26 thereupon wind up on the tapes 25 and unwind from tapes 23. The upward movement of tracks 24 causes corresponding action of tapes 31 and 34 which rotate drum 32 and the pointer 36 to indicate the weight on dial 37. The movement of the rollers 19 and 26 and track 24 will continue until the moment arm of load about the center of the member 17 has decreased in proportion to the increase of the load on the platform, the moment arm of the counterbalancing weights 17, 19, and 26 being constant. Due to the translatory movement of the rollers in addition to their rotation about their axes, the track 24 and consequently the indicator drum 32 are given a greater movement through the tape connections than if rotation of the rollers alone were to effect movement of the track. Consequently a high multiplication between the rollers and the indicator is obtained without using too small a drum 32 or the equivalent of the usually high motion-multiplying gearing between the counterbalancing and indicating means.

In Figs. 5 and 6 is shown a modification in which the upper and lower rollers 40 and 41 are guided for vertical rolling movement along two spaced pairs of tracks 42 and 43 at diametrically opposite sides of the peripheries of the rollers. The rollers are suspended only at one of their sides by means of tapes 44 and 45, from tracks 42. The opposite sides of the rollers are connected to each other by a ribbon 46 which transmits the movement of the upper roller to the lower roller. About midway between the rollers and to the right of and between tracks 43 is mounted an indicator shaft 47 provided with a drum 48 to which tapes 49 and 50, respectively, connected to the upper and lower rollers are fastened.

Upper roller 40 has a cam 51 connected by tape 52 to the lower weighing mechanism. The counterbalancing operation and functioning of the resistant rollers 40 and 41 is similar to that of rollers 19 and 26 of the first-described embodiment. In the second form, however, the construction is simplified by eliminating an indicator operating frame such as 24 of the first form and driving the indicator directly by the rollers through tapes 49 and 50. The relation of the parts is such that the indicator will move clockwise when the load is applied to roll the resistant rollers upwardly along the tracks 42 and 43.

While the invention has been explained in connection with the several forms shown in the drawings, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a scale, spaced tracks, a load resistant member between the tracks and having opposite surfaces in effective rolling engagement with the tracks, tapes connecting the resistant member to the tracks, load actuated means separate from and movable relative to the tracks and connected to said member for causing rolling movement of the resistant member along said tracks upon application of the load, an indicator, and actuating means for the indicator under control of the resistant member disposed along a line passing between the tracks.

2. In a scale, spaced tracks, one of which is movable, a load resistant member between the tracks and having opposite surfaces in substantial rolling engagement with the tracks, tapes connecting the member to the tracks, load actuated means separate from and movable relative to the tracks and connected to the resistant member for causing rolling movement of the member along said tracks, said member when rolling along the tracks actuating said movable track through the tape connection to the latter, an indicator, a shaft carrying the indicator, a portion of the shaft being located between the tracks, and driving connections from the movable track to said shaft portion.

3. In a scale, spaced relatively movable, generally vertical tracks, a load resistant device between the tracks having opposite rolling surfaces substantially engaging the tracks, tapes suspending the opposite surfaces of the device from said tracks, load actuated means separate from and movable relative to said tracks and having a connection including a tape to one of said tracks for causing movement of the latter one track to effect rolling movement of said surfaces along said tracks, an indicator, and operating means for the indicator under control of the resistant device disposed between the tracks.

4. In a scale, a stationary track, a load resistant device rolling at one side along said track, a tape suspending the member from the track, a translatably movable element with which the opposite side of said resistant device has rolling engagement, a tape suspending said element from the resistant device to cause translatory movement of the element upon rolling of the device along the stationary track, load-actuated means separate from and movable relative to said tracks and connected to the device for causing the device to roll along said track, an indicator, and operating means for the indicator under control of the resistant device disposed between the track and the aforesaid elements.

5. In a scale, a pair of spaced, generally vertical, relatively movable tracks, a plurality of spaced load resistant devices, each having opposite rolling surfaces in rolling engagement with the tracks, tapes connecting the members to the tracks, load actuated means for causing the resistant devices to roll upwardly along said tracks upon application of the load and to thereby effect relative movement of the tracks, an indicator, and operating means for the indicator disposed between the tracks and between the resistant devices and under control of the latter.

6. In a scale, a pair of spaced relatively movable tracks, load resistant means including a statically balanced weight having rolling engagement at opposite sides with the tracks, tapes connecting the weight to the tracks, load transmitting means, connections between the load transmitting means and said weight including means for varying the proportion of the applied load force to the gravitational force of said weight, an indicator, a shaft carrying the indicator and disposed between the tracks, and operating connections from one of said tracks to said shaft.

7. In a scale, a load transmitting system and a load counterbalancing system, connections between the two systems including means for varying the relative proportions of the moment arms of the systems, in accordance with the effective load, the counterbalancing system comprising a statically balanced weight, a track along which the weight rolls, and a tape suspending the weight from the track, the weight being free to move away from the track laterally of the direction of movement of the weight along the track, the track tape and weight being relatively arranged to tend to constantly maintain the weight in effective rolling contact with the track.

8. In a scale, a load transmitting system and a load counterbalancing system, connections between the two systems including means for varying the relative proportions of the moment arms of the two systems in accordance with the load, the counterbalancing system including a statically balanced weight, an inclined track along which the weight rolls, and a tape suspending the weight from the track and tending to swing the weight bodily in a direction to maintain the latter in effective rolling engagement with the track.

9. In a scale, a track, a pair of vertically spaced load resistants, each having rolling engagement at one side with the track, means connecting the resistants for joint rolling movement along said track, an indicator, operating means for the indicator disposed between the resistants and between aforesaid connecting means and the track, and means connecting the resistants to the indicator operating means.

10. In a scale, a track, a pair of vertically spaced load resistants, each having rolling engagement at one side with the track, a ribbon connection between the opposite sides of the resistants to connect the resistants for joint movement along the track, an indicator, a device for operating the indicator disposed between the track and aforesaid ribbon connection, and means for controlling the movement of the device by said resistants.

11. In a scale, a frame having a stationary track, a load resistant device having round portions for rolling engagement with the track, a tape suspending the device from the track, an eccentric element rigidly connected to the device, load transmitting means connected to the eccentric element for rocking the latter and causing the round portions of said device to roll along the track, a second resistant device below the first resistant device also in rolling engagement with the track, a tape suspending the second device from the track, a tape connection between the first and second devices to impart movement to the latter upon movement of the former, an indicator, a shaft therefor, a driving element on the shaft disposed between the devices and between the track and aforesaid tape connection, and means connecting the devices to the driving element.

12. In a scale, guiding means, a pair of load resistant elements having common, interdependent rolling movement along said means, an indicator, a round driving member therefor, and a ribbon connection secured to each element and to the round driving member, the ribbon connections being oppositely wound about the member to rotate the latter upon rolling movement of the resistant elements.

13. In a scale, a guide track, upper and lower load resistant elements, load responsive means for rolling said elements in a generally vertical direction along the track, an indicator, a round driving member therefor, and a tape connection extending from each element to the driving member to rotate the latter upon movement of the resistant elements.

14. In a scale such as defined in claim 13, and a ribbon connecting the elements to each other for transmitting the movement of one element to the other.

15. In a scale, a pair of generally parallel elements, a rolling resistant between the elements, tape connections between opposite sides of the resistant and the elements, load transmitting means, connections between the load transmitting means and the resistant for rolling the latter along said elements, said connections including a cam to vary the proportion of the applied load force to the resistant force of the resistant in accordance with the magnitude of the load, and load indicating means including a shaft disposed along a line passing between said elements and rotated under control of the resistant to indicate the load.

16. In a scale, a pair of generally parallel elements, a rolling resistant between the elements, tape connections between the resistant and the elements, load transmitting means, connections between the transmitting means and the resistant for rolling the latter along said elements, said connections including means for varying the proportion of the applied load force to the resistant force of said resistant in accordance with the magnitude of the load, load indicating means including a shaft disposed along a line passing between said elements, and connections between one of the elements and the shaft for operating the indicating means to indicate the load.

17. In a scale, a load resistant, an element with which one side of the resistant has rolling engagement, a tape connection between the resistant and the element, load transmitting means, connections between the transmitting means and the resistant for rolling the latter upwardly along said element upon application of the load, said connections including means for varying the proportion of the applied load force to the resistant force of said resistant in accordance with the magnitude of the load, a second element connected to the opposite side of the resistant to be moved upwardly thereby upon application of the load, and indicating means including a shaft disposed along a line passing between said elements and operated by the second element for indicating the load.

WILLIAM N. GILBERT.